(12) United States Patent
Lin et al.

(10) Patent No.: US 7,937,520 B2
(45) Date of Patent: May 3, 2011

(54) GENERAL PURPOSE INTERFACE CONTROLLER OF RESOURE LIMITED SYSTEM

(75) Inventors: Chang-Fu Lin, Hsinchu (TW); Shu-Wen Teng, Taipei (TW); Wei Cheng Gu, Hsinchu (TW); Cheng-Che Chen, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 302 days.

(21) Appl. No.: 12/271,073

(22) Filed: Nov. 14, 2008

(65) Prior Publication Data
US 2009/0182921 A1 Jul. 16, 2009

Related U.S. Application Data (60) Provisional application No. 61/020,414, filed on Jan. 11, 2008.

(51) Int. Cl.
G06F 13/36 (2006.01)

(52) U.S. Cl. ............................. 710/315; 710/11; 710/110

(58) Field of Classification Search ............... 710/10–12, 710/22, 26–27, 36, 38, 105, 110, 308, 315, 710/316
See application file for complete search history.

(56) References Cited

U.S. PATENT DOCUMENTS

| | | | |
|---|---|---|---|
| 7,145,903 B2* | 12/2006 | Gutierrez | 370/362 |
| 7,174,406 B1* | 2/2007 | Abdallah et al. | 710/240 |
| 7,246,185 B1* | 7/2007 | Pritchard et al. | 710/110 |
| 7,305,510 B2* | 12/2007 | Miller | 710/305 |
| 7,475,176 B2* | 1/2009 | Pong et al. | 710/107 |
| 2002/0023186 A1* | 2/2002 | Kim | 710/244 |
| 2003/0107656 A1 | 6/2003 | Ito et al. | |
| 2003/0107669 A1 | 6/2003 | Ito et al. | |
| 2003/0222998 A1 | 12/2003 | Yamauchi et al. | |
| 2004/0119844 A1 | 6/2004 | Aldrich et al. | |
| 2006/0181547 A1 | 8/2006 | Loo | |
| 2006/0182149 A1 | 8/2006 | Ramsdale | |
| 2006/0182411 A1 | 8/2006 | Loo | |
| 2006/0184987 A1 | 8/2006 | Allen et al. | |
| 2007/0186018 A1* | 8/2007 | Radulescu et al. | 710/100 |
| 2007/0233928 A1 | 10/2007 | Gough | |
| 2008/0060042 A1* | 3/2008 | Fung | 725/134 |
| 2009/0113097 A1* | 4/2009 | Drerup et al. | 710/110 |
| 2009/0125663 A1 | 5/2009 | Schoegler | |

FOREIGN PATENT DOCUMENTS

| | | |
|---|---|---|
| CN | 1525759 A | 9/2004 |
| CN | 201044473 | 4/2008 |
| DE | 102005026436 A1 | 12/2006 |

OTHER PUBLICATIONS

English language translation of abstract of CN 201044473 (published Apr. 2, 2008).
English abstract of DE102005026436A1; pub. Dec. 14, 2006.
English abstract of CN1525759A; pub. Sep. 1, 2004.

* cited by examiner

Primary Examiner — Khanh Dang
(74) Attorney, Agent, or Firm — Thomas|Kayden (57) ABSTRACT

The invention discloses a general purpose interface controller, including a slave interface controller and a master interface controller, used to exchange data among master devices and slave devices in an electronic device. The slave interface controller receives data and a first control signal from one of the master devices, and converts the first control signal to a request signal. The master interface controller receives the data and the request signal from the slave interface controller, converts the request signal to a second control signal recognized by at least one of the slave devices, and forwards the data and the second control signal to the slave device.

16 Claims, 7 Drawing Sheets

GENERAL PURPOSE INTERFACE CONTROLLER OF RESOURE LIMITED SYSTEM

CROSS REFERENCE TO RELATED APPLICATIONS

This application claims the benefit of U.S. Provisional Application No. 61/020,414, filed on Jan. 11, 2008 and entitled "Systems and Methods for Control Signal and Data Transmission between Various Types of Electronic Modules". The entire contents of which are hereby incorporated by reference.

BACKGROUND OF THE INVENTION

1. Field of the Invention

The invention relates to an electronic device comprising different peripherals, and more particularly to an electronic device having a general purpose interface controller capable of providing data and control signal transmissions among the peripherals.

2. Description of the Related Art

Most electronic devices such as mobile phones, personal digital assistants (PDAs), or global positioning system (GPS) navigators, usually integrate various kinds of peripherals, such as a liquid crystal module (LCM), memory, a camera module, and universal serial bus (USB) devices, and the like. Thus, making efficient peripheral integration of the electronic device is important for electronic device efficiency.

Figure 1:
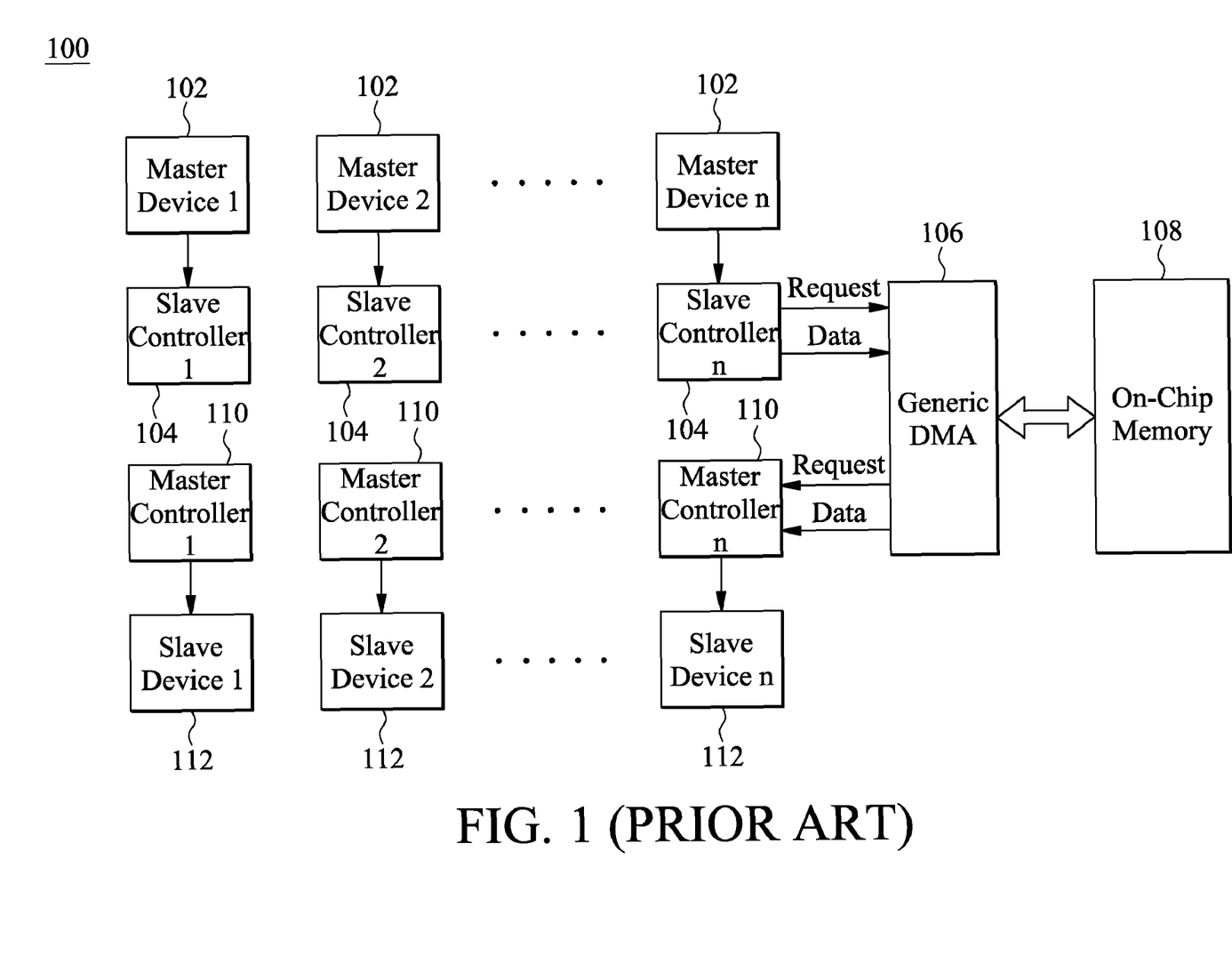
FIG. 1 shows a conventional implementation for integrating various kinds of peripherals in a handheld device.

FIG. 1 shows a conventional implementation for integrating various kinds of peripherals in a handheld device. A handheld device 100 comprises master devices 102, slave controllers 104, a generic direct memory access (DMA) controller 106, an on-chip memory 108, master controllers 110, and slave devices 112. Each of the master devices 102 has a corresponding slave controller 104 (e.g. the slave controller 1 corresponds to the master device 1, the slave controller 2 corresponds to the master device 2, and so on), and each of the slave devices 112 has a corresponding master controller 110 as well (e.g. the master controller 1 corresponds to the slave device 1, the master controller 2 corresponds to the slave device 2, and so on). One of the slave controllers 104 may receive data and first control signals from its corresponding master device 102, convert the first control signals to a request signal, and forward the data and request signal to the generic DMA controller 106. The generic DMA controller 106 stores the received data and request signal in the on-chip memory 108, and then forwards the data and request signal stored in the on-chip memory 108 to one of the master controllers 110 corresponding to the request signal. The master controller 110 receives the data and request signal, converts the request signal to second control signals recognized by its corresponding slave device 112, and forwards the data and the second control signals to the corresponding slave device 112. One disadvantage of the conventional implementation is that it consumes excessive space when a new peripheral (i.e. a master/slave device) is introduced into the handheld device, since each master/slave device needs a dedicated slave/master controller to transmit/receive data and control signals. Therefore, a need exists to provide more efficient systems and methods for signal transmission between various types of electronic modules.

BRIEF SUMMARY OF THE INVENTION

The invention provides a general purpose interface controller used to exchange data among master devices and slave devices in an electronic device. The general purpose interface controller comprises a slave interface controller and a master interface controller. The slave interface controller receives data and a first control signal from one of the master devices, and converts the first control signal to a request signal. The master interface controller receives the data and the request signal from the slave interface controller, converts the request signal to a second control signal recognized by at least one of the slave devices, and forwards the data and the second control signal to the slave device.

The invention also provides a general purpose interface controller used to exchange data among master devices and slave devices in an electronic device. The general purpose interface controller comprises a slave interface controller and a master interface controller. The slave interface controller receives data and a first control signal from one of the master devices and converts the first control signal to a request signal. The master interface controller receives the data and the request signal from the slave interface controller, converts a data period of the data, converts the request signal to a second control signal recognized by at least one of the slave devices, and forwards the converted data and the second control signal to at least one of the slave devices.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 2:
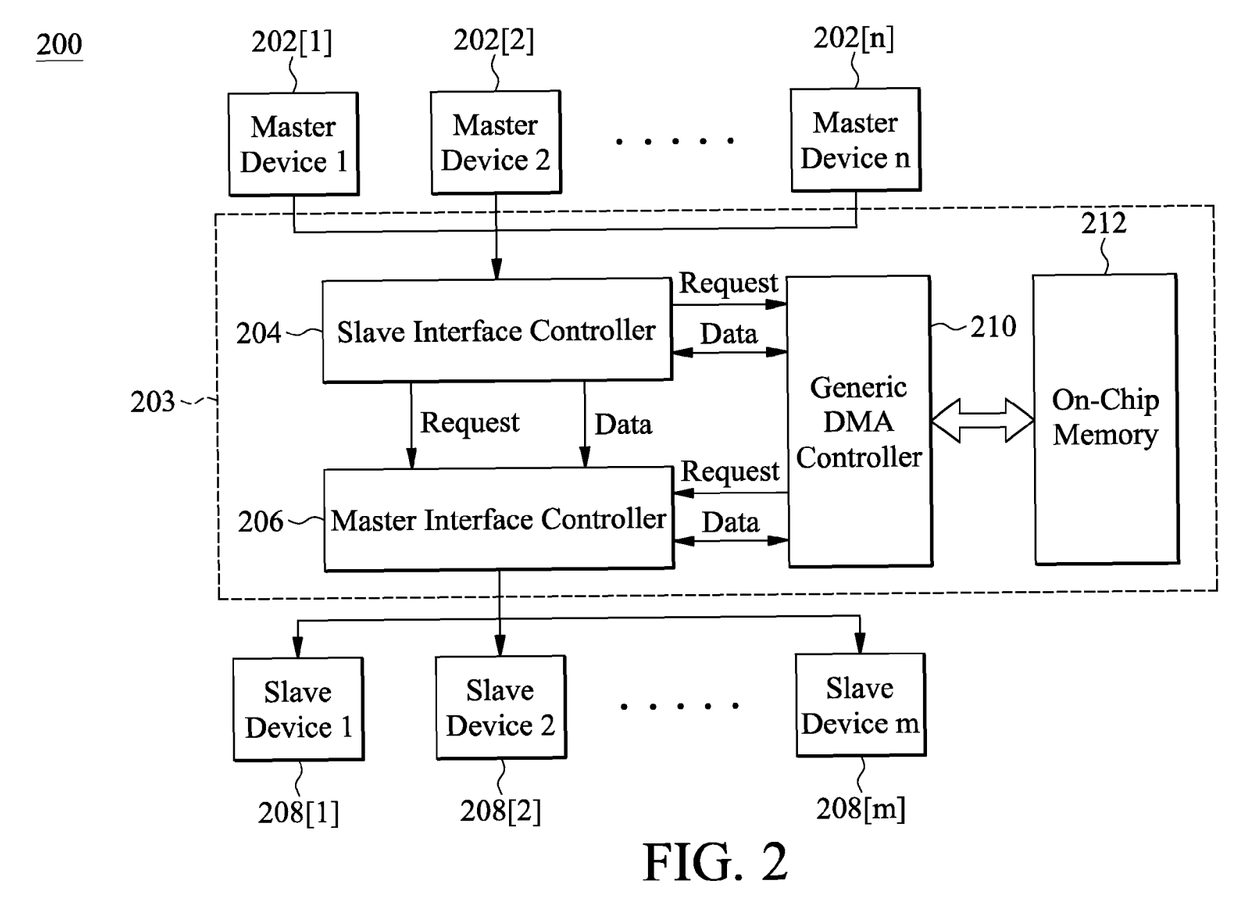
FIG. 2 is an embodiment of hardware architecture of a handheld device according to the invention.

For a resource limited system, instead of a number of dedicated controllers, an embodiment of a system provides a general purpose interface controller to exchange data among different kinds of devices, as shown in FIG. 2. A handheld device 200 may comprise master devices denoted as 202[1] to 202[n], a general purpose interface controller 203, and slave devices denoted as 208[1] to 208[m], where n represents a total number of master devices, m represents a total number of slave device, and m may equal n or may not equal n. The handheld device 200 may be a mobile phone, a smart phone, a PDA, or the similar. The general purpose interface controller 203 may comprise a slave interface controller 204, a master interface controller 206, a generic DMA controller 210, and an on-chip memory 212. The slave interface controller 204, connected/coupled to the master devices 202, may receive data and master-to-interface control signals used for decoding the data from one of the master devices 202[1] to 202[n]. For example, the data may be image data, such as pixel data of an RGB color model, a YUV color model, or the similar. The master-to-interface control signals may comprise a pixel clock signal used to synchronize data transmission of the image data, a vertical sync signal indicating the beginning of a frame transmission (or the frame changes), a horizontal sync signal that the signal being carried on the Data bus is actual pixel data of a frame line, or a device selection signal indicating which slave device(s) is/are to be activated to receive the image data. The slave interface controller 204 is designed as a general purpose slave interface controller for all the master devices 202[1] to 202[n]. When one of the master devices is transmitting the data and the master-to-interface control signals to the slave interface controller 204, the slave interface controller 204 will not serve the other master devices. The slave interface controller 204 may receive the data and the master-to-interface control signals and then convert the master-to-interface control signals to a request signal. The request signal may contain information about the destination (e.g. one of the slave device 208[1] to 208[m]) where the data is required to be transmitted and information for data decoding. The slave interface controller 204, connected/coupled to the master interface controller 206, may transmit the data and the request signal to the master interface controller 206. The master interface controller 206 is designed as a general purpose master interface controller for all the slave devices 208[1] to 208[m]. The master interface controller 206 may convert the request signal to interface-to-slave control signals recognized by the requisite slave device(s), and then forward the data and the interface-to-slave control signals to the requisite slave device(s). When the data is image data, the interface-to-slave control signals may comprise a chip selection signal used to enable one or more slave devices 208[1] to 208[m] to latch the image data, a pixel clock signal used to synchronize data transmission of the image data, or a write strobe signal used to enable the requisite slave device(s) to retrieve the image data.

The data transmission requirements between the master devices and the slave devices, however, may be different. For example, the data rate acceptable with one slave device may be lower than the data rate generated by one master device. To solve this problem, the slave interface controller 204 may transmit the data and the request signal to the generic DMA controller 210. The generic DMA controller 210 may store (i.e. buffer) the data and the request signal in the on-chip memory 212, and then forward the data and the request signal to the master interface controller 206 in a data rate acceptable with one or more slave devices 208[1] to 208[m]. The master interface controller 206 may receive the data and the request signal from the generic DMA controller 210 and convert the request signal to the interface-to-slave control signals recognized by the requisite slave device(s), and then forward the data and the interface-to-slave control signals to the requisite slave device(s).

Figure 3:
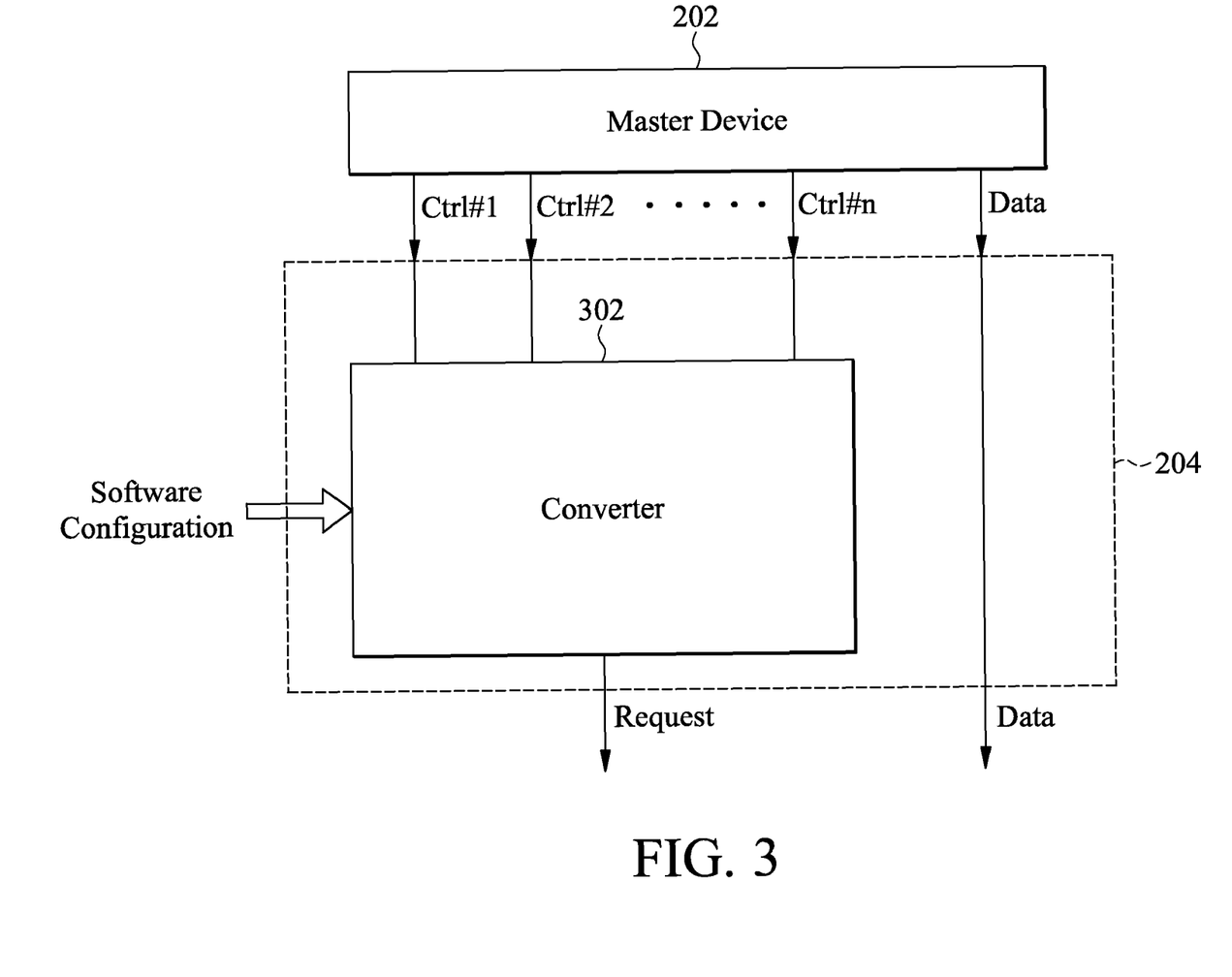
FIG. 3 is an example of the signal transmission between master devices and a slave interface controller of FIG. 2.

FIG. 3 is an example of the signal transmission between the master devices and the slave interface controller of FIG. 2. It is noted that only one master device can occupy the resource of the interface controller 203 at a time, and the other master devices are disallowed to transmit data and control signals during the data transmission of the active master device 202. Thus, only the active master device denoted as 202 is depicted in FIG. 3 for brevity. The active master device 202 may generate data and master-to-interface control signals (denoted Ctrl#1, Ctrl#2, to Ctrl#n) for decoding the data, and then transmit the data and the master-to-interface control signals to the slave interface controller 204. The slave interface controller 204 may comprise a converter 302 used to convert the master-to-interface control signals to a request signal, and the data may not be processed by the slave interface controller 204. The converter 302 may comprise a variety of logic circuits (e.g. multiplexers, de-multiplexers, flip-flops, etc.) that can be configured by software.

Figure 4:
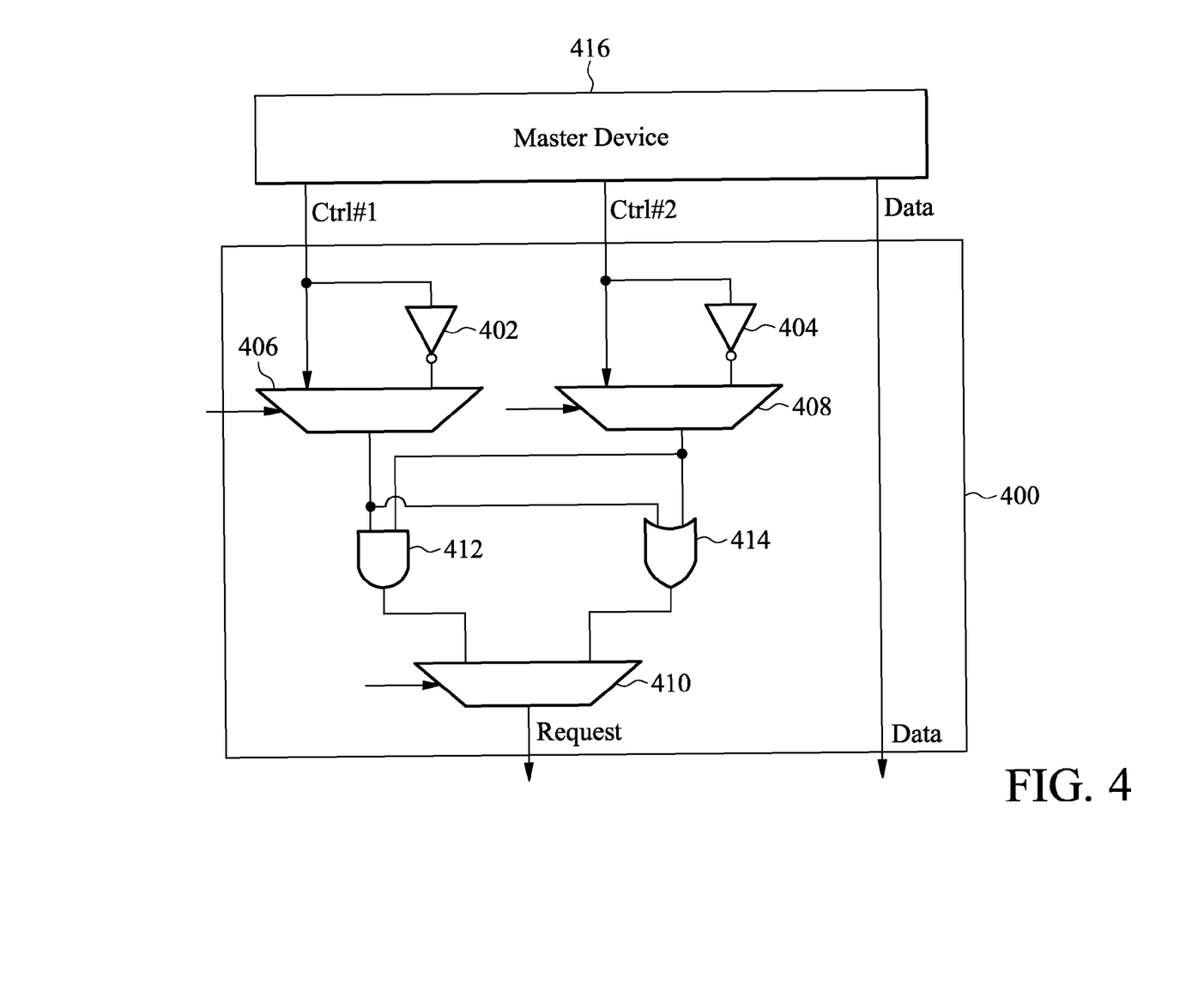
FIG. 4 is an example of architecture of a converter that converts two master-to-interface control signals to a request signal.

FIG. 4 is an example of architecture of a converter 400 that converts two master-to-interface control signals (Ctrl #1 and Ctrl#2) received from a master device 416 to a request signal. It is noted that the converter 400 may be connected to more than one master device, while only one master device is depicted in FIG. 4 for brevity. The converter 400 comprises inverters 402 and 404, multiplexers 406, 408, and 410, an AND gate 412, and an OR gate 414. The multiplexer 406 has a first input port receiving the Ctrl#1 and a second input port receiving the inverted Ctrl#1 through the inverter 402. The multiplexer 408 has a first input port receiving the Ctrl#2 and a second input port receiving the inverted Ctrl#2 through the inverter 404. The multiplexer 410 has a first input port receiving the output of the AND gate 412 (which executes logical conjunctions on the outputs of the multiplexers 406 and 408) and a second input port receiving the output of the OR gate 414 (which executes logical disjunctions on the outputs of the multiplexers 406 and 408). The multiplexers 406, 408, and 410 may be controlled by software/firmware executed by a micro control unit (MCU) (not shown) to arrange the signal paths in the converter 400. For example, the multiplexer 406 may be configured to output the inverted Ctrl#1, the multiplexer 408 may be configured to output the original Ctrl#2, and the multiplexer 410 may be configured to output the output of the OR gate 414 as the request signal. One advantage of the embodiment is that the converter can receive the master-to-interface control signals from one of various master devices and adaptively convert the master-to-interface control signals to the request signal configured by software/firmware.

Figure 5:
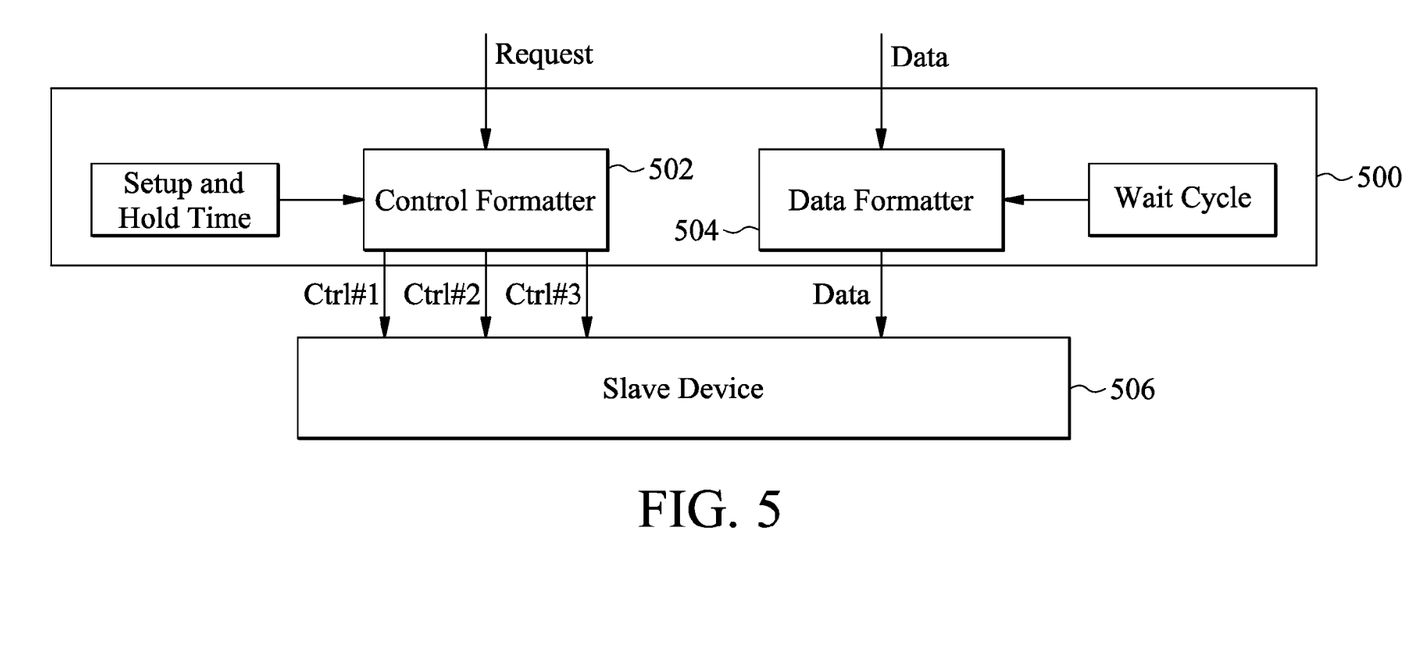
FIG. 5 is an embodiment of a master interface controller.

FIG. 5 is an embodiment of a master interface controller 500. The master interface controller 500 may comprise a control formatter 502 and a data formatter 504. It is noted that only one slave device 506 as the destination of the data is depicted in FIG. 5 for brevity, while the master interface controller 500 may be connected/coupled to more than one slave devices. The control formatter 502 may receive a request signal from a slave interface controller (e.g. slave interface controller 204 of FIG. 2) or a generic DMA controller (e.g. generic DMA controller 210 of FIG. 2), and convert the request signal to interface-to-slave control signals recognized by the slave device 506 for data decoding. The converted interface-to-slave control signals must conform to the setup and hold time required by the slave device 506. The setup and hold time may be configured by software/firmware, which may be executed by an MCU (not shown). The data formatter 504 may receive data directly from the slave interface controller or from the generic DMA controller, and convert the data period (i.e. wait cycle) of the received data required by the slave device 506. The wait cycle may also be configured by the software/firmware.

Figure 6:
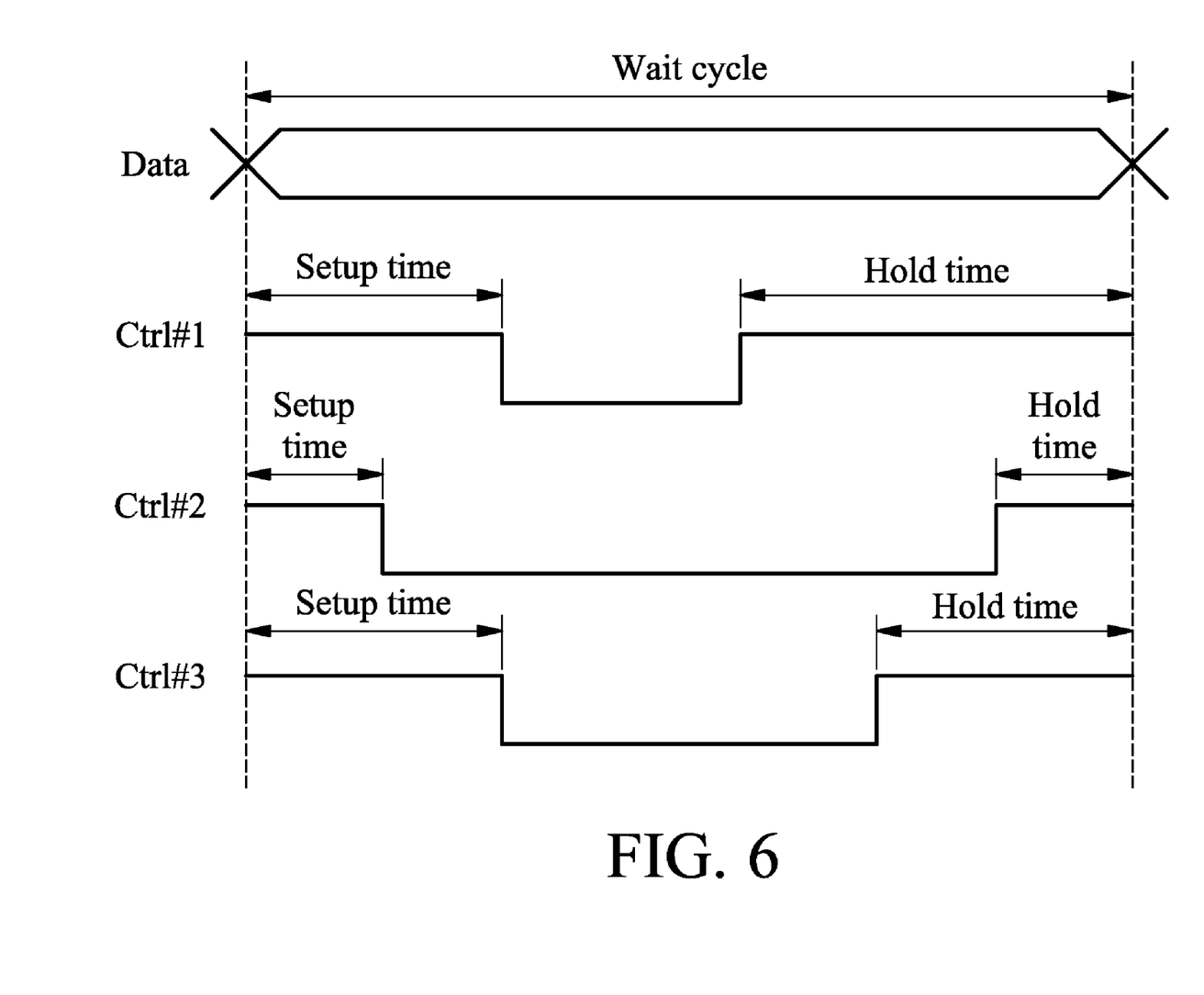
FIG. 6 is a diagram illustrating exemplary output waveforms of a master interface device of FIG. 5.

FIG. 6 is a diagram illustrating exemplary output waveforms of the master interface controller 500 of FIG. 5 for the slave device 506. The wait cycle of the Data signal is defined as the acceptable data period for the slave device 506, which may also referred to as data change frequency on the Data bus. The setup time may associate with a time period from the beginning of a wait cycle, in which a slave device requires to set up its environment for latching data, while the hold time may associate with a time period that data must be held before the end of the wait cycle. Accordingly, the control signal may be adjusted to a higher or lower level after the end of the configured setup time and before the start of the configured hold time. As a result, when detecting the control signal at a higher or lower level, or a rising or a falling edge of the control signal the slave device may latch on data on the Data bus. Referring to FIG. 6, in a wait cycle, for example, the control signal Ctrl#1, Ctrl#2 or Ctrl#3 is adjusted to a lower level after the configured setup time and before the configured hold time. It is to be noted that different slave devices may have different requirements of the wait cycle, the setup time, and the hold time, and the master interface controller as shown in FIG. 5 adaptively generates the data signal and the control signals that meet the requirements for a slave device. It is to be understood that one of the control signals may carry information indicating which slave device(s) is/are enabled to receive data.

Figure 7:
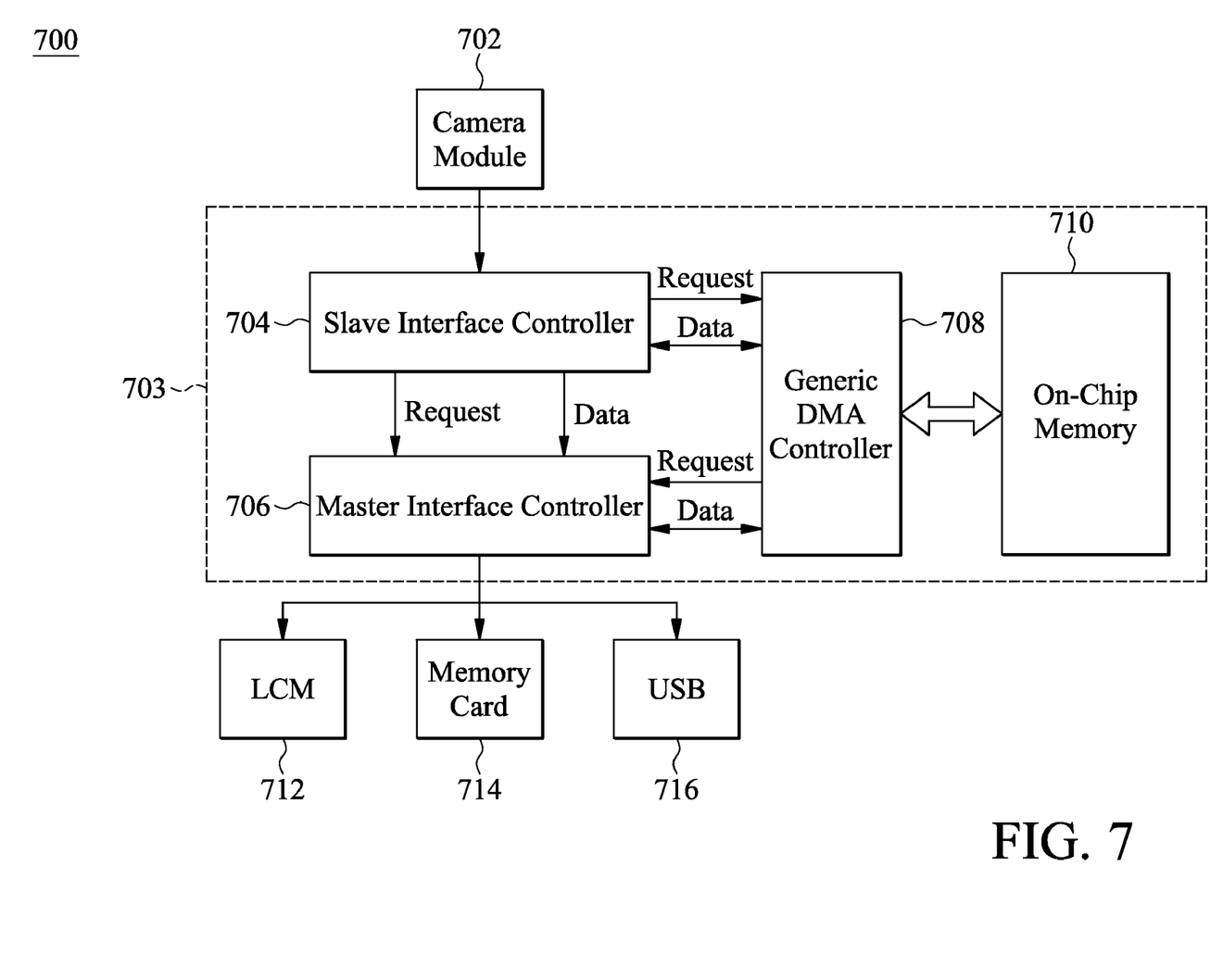
FIG. 7 is an embodiment of a system that provides general purpose slave and master interface controllers for image data delivery.

FIG. 7 is an embodiment of a system that provides the general purpose slave and master interface controllers for image data delivery. A system 700 may comprise a camera module 702, a general purpose interface controller 703, a liquid crystal module (LCM) 712, a memory card drive 714, and a universal serial bus (USB) storage device 716. The memory card drive 714 may read data from or write data to a flash memory card, such as a secure digital (SD) card, a memory stick (MS) card, a smart media (SM) card, a compact flash (CF) card, an extreme digital (xD) picture card, or the similar. The general purpose interface controller 703 may comprise a slave interface controller 704, a master interface controller 706, a generic DMA controller 708, and an on-chip memory 710. The camera module 702 can be regarded as the master device in FIG. 2. The camera module 702 records real-time color images as intensities of red, green and blue of a plurality of frames by sensing the light from an external light source via a sensor array thereof, wherein the intensities are stored as variable (analog) charges on a charge-coupled device (CCD) or complementary metal-oxide-semiconductor (CMOS) sensor array. The charges are converted into digital data by the ADC of the camera module 702. The ISP of the camera module 702 may adjust contrast and detail and compress the digital data for subsequent display and storage. The camera module 201 outputs the frames on a Data bus after capturing the images and generates a plurality of control signals to control the synchronized transmission of the frames, wherein each frame may comprise a plurality of frame lines and each frame line may comprise a plurality of pixel data, and wherein the synchronization control signals may comprise a vertical synchronization signal $S_{Vsync}$, a horizontal synchronization signal $S_{Href}$, and a pixel clock $S_{Pixel\_Clk}$. The slave interface controller 704 may convert the control signals to a request signal and transmit the image data and the request signal directly to the master interface controller 706 or to the generic DMA controller 708. The generic DMA controller 708 may store the image data and the request signal in the on-chip memory 710, and then forward the data and the request signal to the master interface controller 706 according to the data transmission requirements of the LCM 712, the memory card drive 714, or the USB storage device 716. The LCM 712, the memory card drive 714, or the USB storage device 716 can be regarded as the slave device in FIG. 2. The master interface controller 706 may receive the data and the request signal from the generic DMA controller 708 or directly from the slave interface controller 704, convert the request signal to the control signals recognized by the LCM 712, the memory card drive 714, or the USB storage device 716 (e.g. the pixel clock signal, the chip selection signal, or the write strobe signal), and then forward the data and the control signals to the LCM 712, the memory card drive 714, or the USB storage device 716. The LCM 712 may contain an LCD panel displaying the pixel data of the frames and an LCD driver fetching the pixel data on the data bus according to a chip selection signal and a write strobe signal and driving the LCD panel to display the fetched pixel data. The USB storage device 716 may fetch and store the pixel data on the data bus according to similar control signal(s).

While the invention has been described by way of examples and in terms of preferred embodiments, it is to be understood that the invention is not limited thereto. Any variation or modification can be made by those skilled in art without departing from the spirit or scope of the invention. Therefore, the scope of the appended claims should be accorded the broadest interpretation to encompass all such modifications and similar arrangements.

What is claimed is:

1. A general purpose interface controller used to exchange data among master devices and slave devices in an electronic device, comprising:
    a slave interface controller configured to receive data and a first control signal from one of the master devices and convert the first control signal to a request signal, wherein the slave interface controller comprises a converter comprising a logic circuit configured to convert the first control signal to the request signal; and
    a master interface controller configured to receive the data and the request signal from the slave interface controller, convert the request signal to a second control signal recognized by at least one of the slave devices, and forward the data and the second control signal to the slave device; wherein the master interface controller comprises:
    a control formatter configured to generate a waveform of the second control signal recognized by at least one of the slave devices to synchronize data transmission between the master interface controller and at least one of the slave devices; and
    a data formatter configured to convert a wait cycle of the data required by at least one of the slave devices.

2. The general purpose interface controller as claimed in claim 1, wherein the logic circuit is configured by software/firmware.

3. The general purpose interface controller as claimed in claim 1, wherein the control formatter is further configured to set a setup time of the second control signal, and the setup time associates with a time period from the beginning of the wait cycle.

4. The general purpose interface controller as claimed in claim 1, wherein the control formatter is further configured to set a hold time of the second control signal, and the hold time associates with a time period before an end of the wait cycle.

5. The general purpose interface controller as claimed in claim 1, further comprising:
    an on-chip memory; and
    a generic direct memory access controller configured to store the data and the request signal from the slave interface controller in the on-chip memory, and retrieve stored data and the request signal from the on-chip memory to the master interface controller.

6. The general purpose interface controller as claimed in claim 1, wherein a master device is a camera module recording real-time color images as intensities of red, green and blue of a plurality of frames by sensing light from an external light source, and converting the intensities into digital data to be received by the slave interface controller.

7. The general purpose interface controller as claimed in claim 1, wherein the slave device is a liquid crystal module fetching the data from the master interface controller and displaying the fetched data on a liquid crystal display (LCD) panel.

8. The general purpose interface controller as claimed in claim 1, wherein the electronic device is a mobile phone, a smart phone, or a personal digital assistant.

9. A general purpose interface controller used to exchange data among master devices and slave devices in an electronic device, comprising:
   a slave interface controller configured to receive data and a first control signal from one of the master devices and convert the first control signal to a request signal, wherein the slave interface controller comprises a converter comprising a logic circuit configured by software/firmware to convert the first control signal to the request signal; and
   a master interface controller configured to receive the data and the request signal from the slave interface controller, convert a data period of the data required by one of the slave devices, convert the request signal to a second control signal recognized by at least one of the slave devices, and forward the converted data and the second control signal to at least one of the slave devices; wherein the master interface controller comprises:
      a control formatter configured to set a setup time and a hold time of the second control signal recognized by the slave device; and
      a data formatter configured to convert the data period of the data required by the slave device, wherein the setup time, the hold time, and the data period are configured by software/firmware.

10. The general purpose interface controller as claimed in claim 9, wherein the data is image data and the first and second control signals are used for decoding the image data.

11. The general purpose interface controller as claimed in claim 10, wherein the first control signal is a horizontal sync signal indicating that a frame line of the image data is being sent, a first pixel clock signal used to synchronize data transmission of the image data, or a chip selection signal indicating which slave device(s) is/are activated to receive the image data.

12. The general purpose interface controller as claimed in claim 10, wherein the second control signal is a chip selection signal used to enable specific slave device(s) to latch the image data, a second pixel clock signal used to synchronize data transmission of the image data, or a write strobe signal used to enable the slave device to store the image data.

13. The general purpose interface controller as claimed in claim 9, wherein the setup time associates with a time period from the beginning of a wait cycle, and the hold time associates with a time period before an end of the wait cycle.

14. The general purpose interface controller as claimed in claim 9, wherein further comprising:
   an on-chip memory; and
   a generic direct memory access controller configured to store the data and the request signal from the slave interface controller in the on-chip memory, and retrieve stored data and the request signal from the on-chip memory to the master interface controller.

15. The general purpose interface controller in claim 9, wherein a master device is a camera module.

16. The general purpose interface controller as claimed in claim 9, wherein the slave device is a liquid crystal module, a memory card drive, or a universal serial bus storage device.

* * * * *